UNITED STATES PATENT OFFICE.

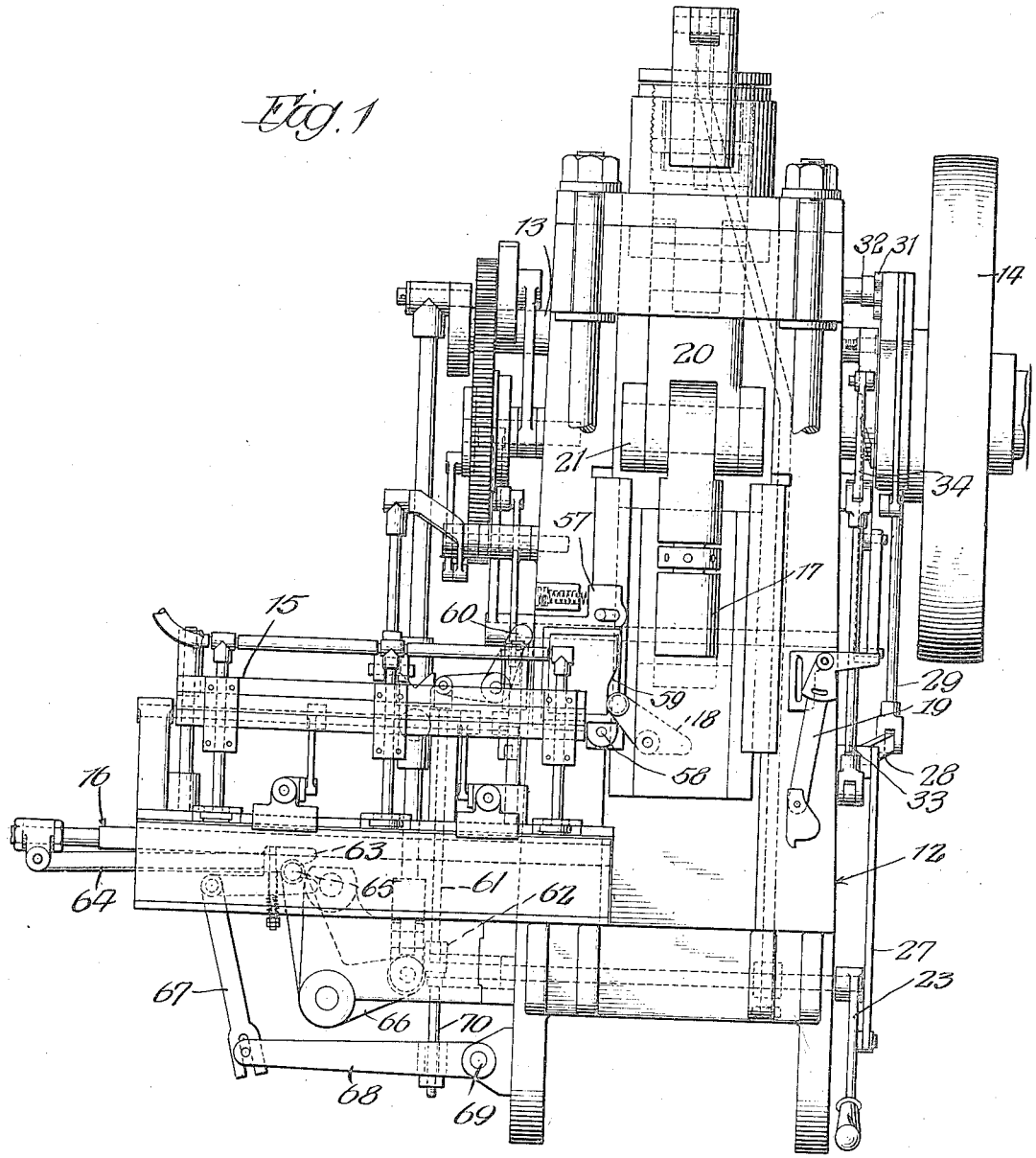

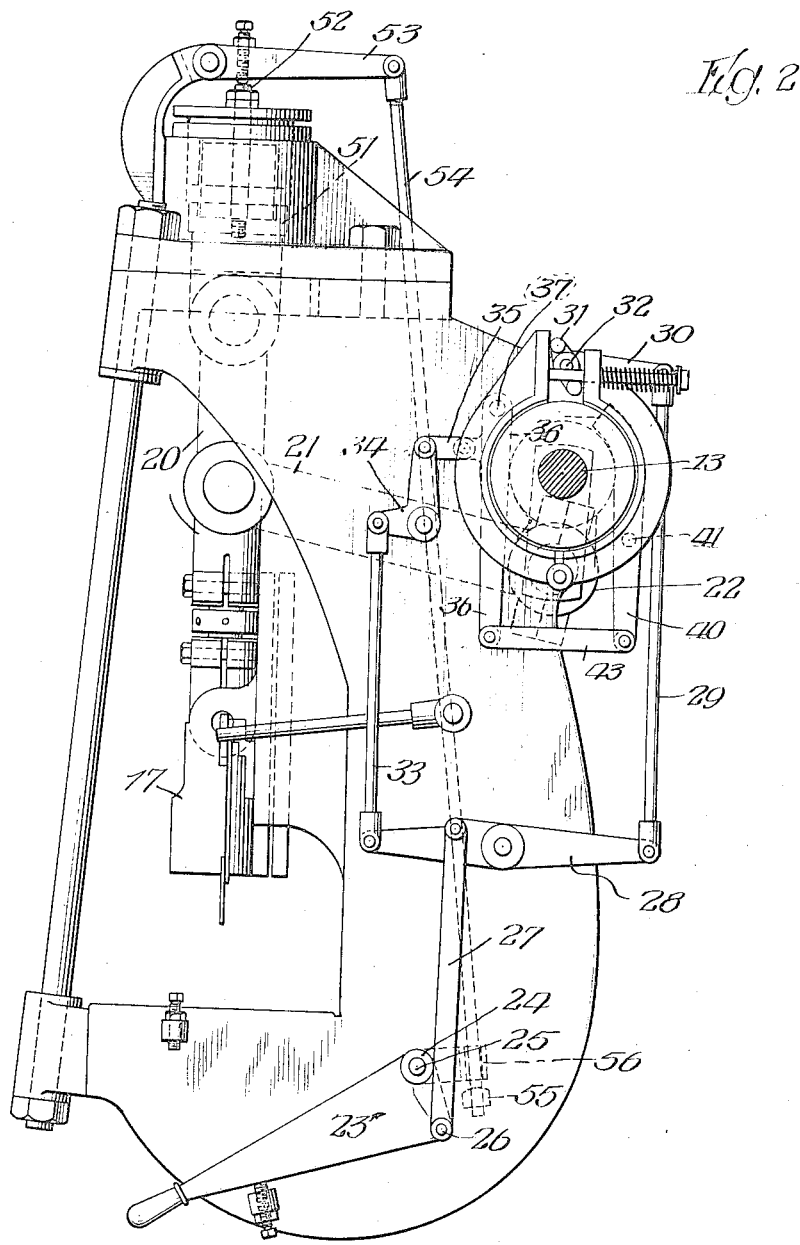

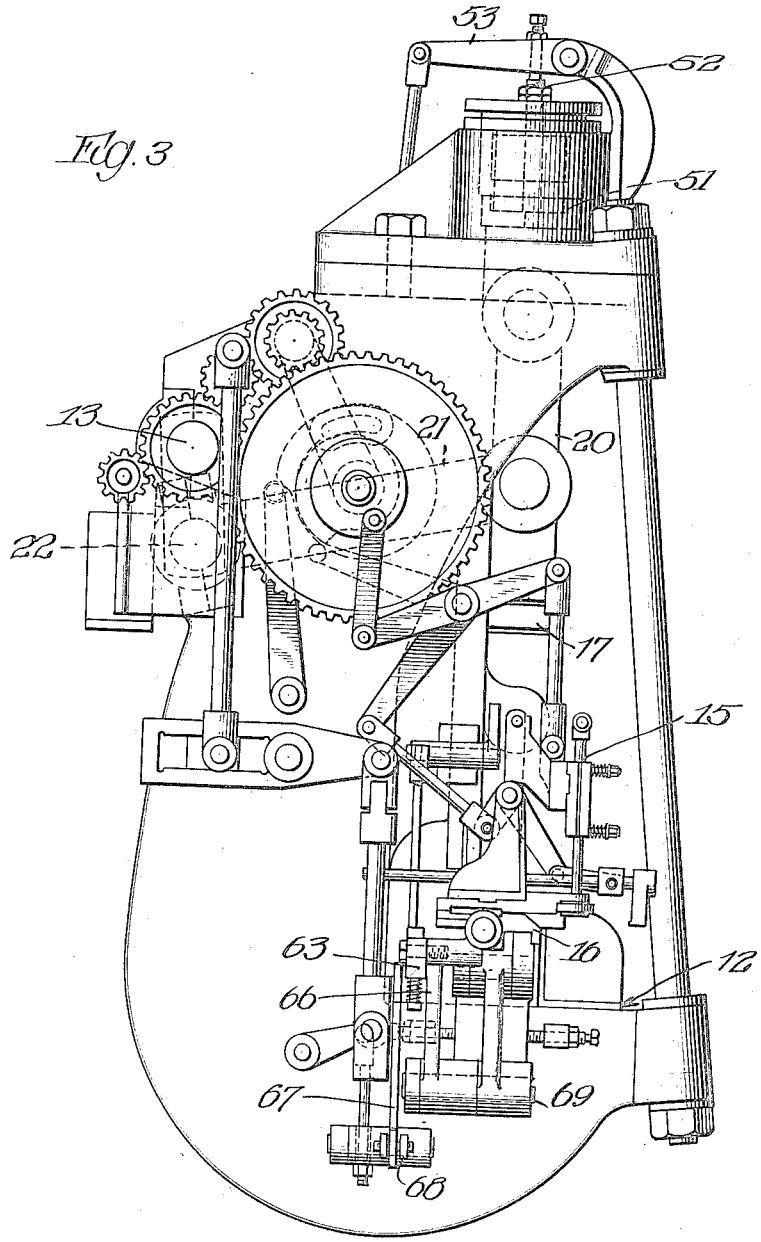

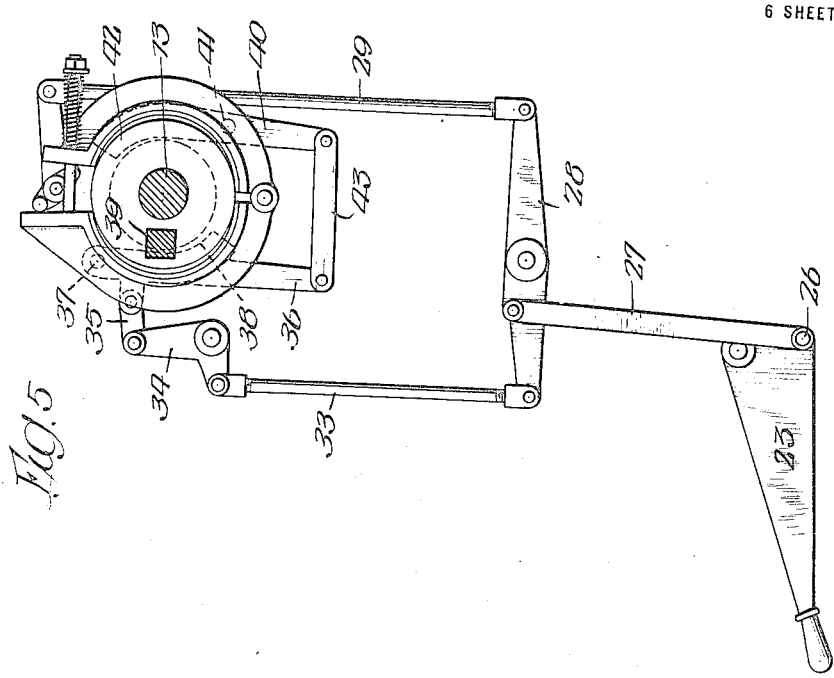
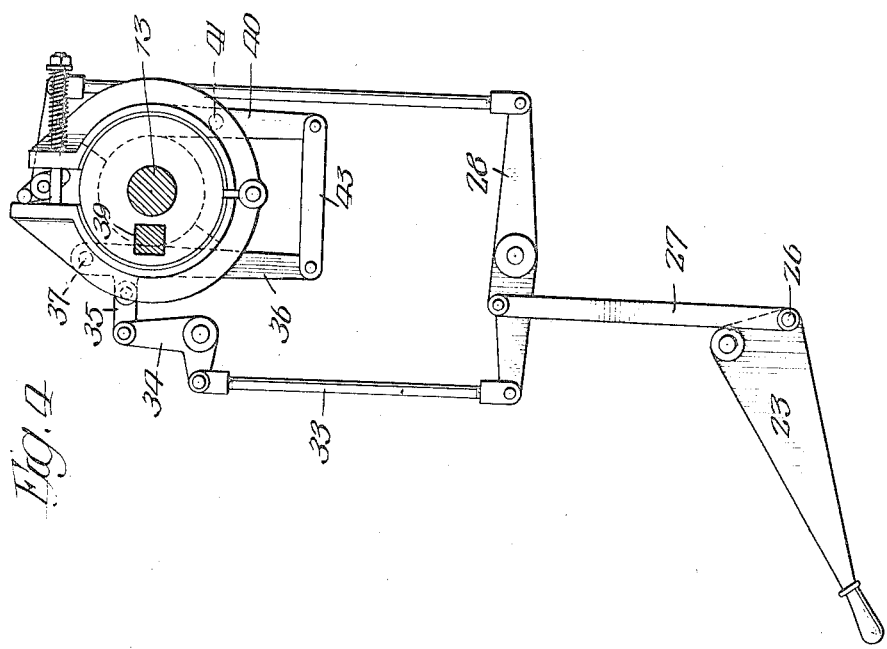

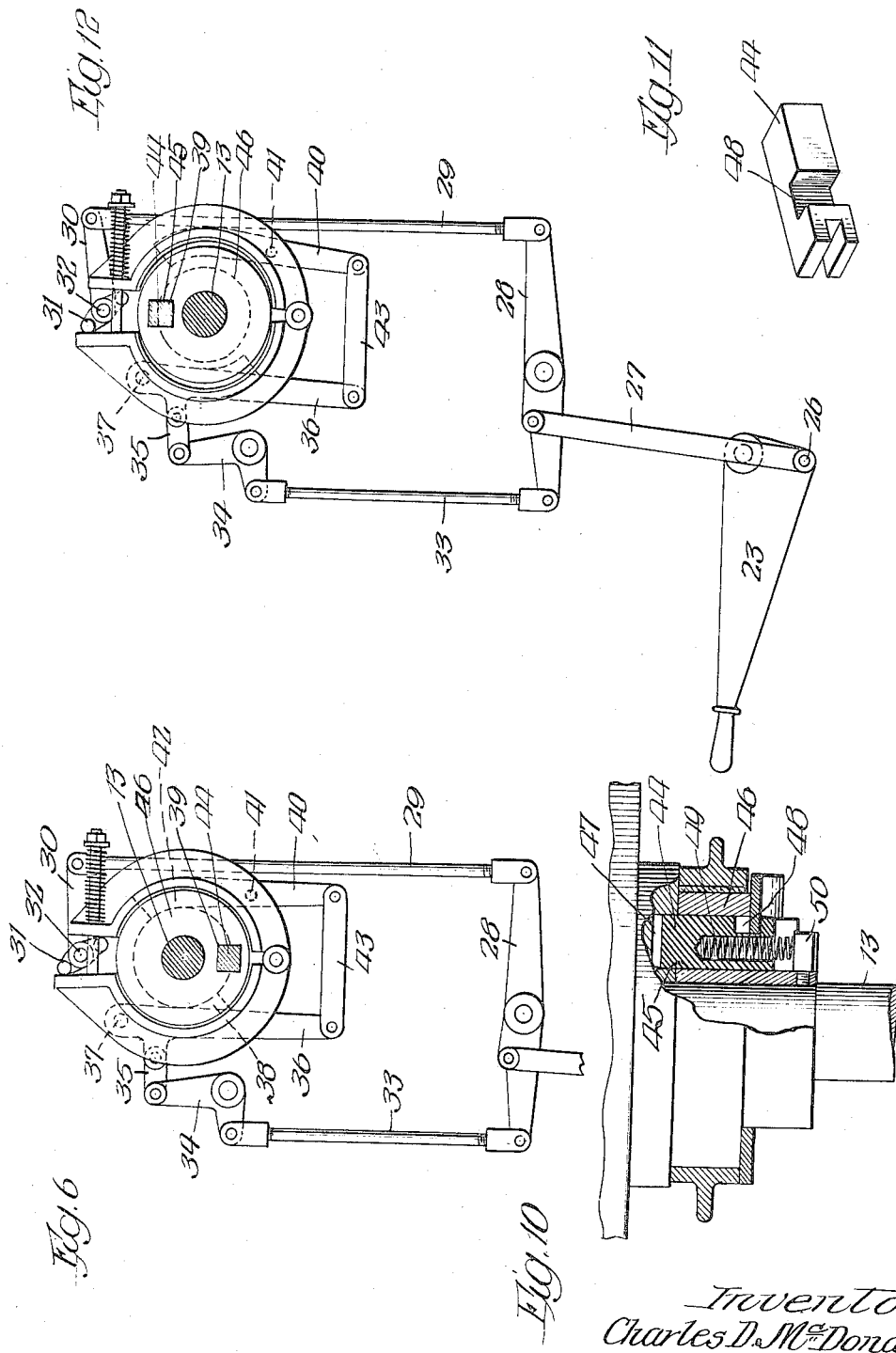

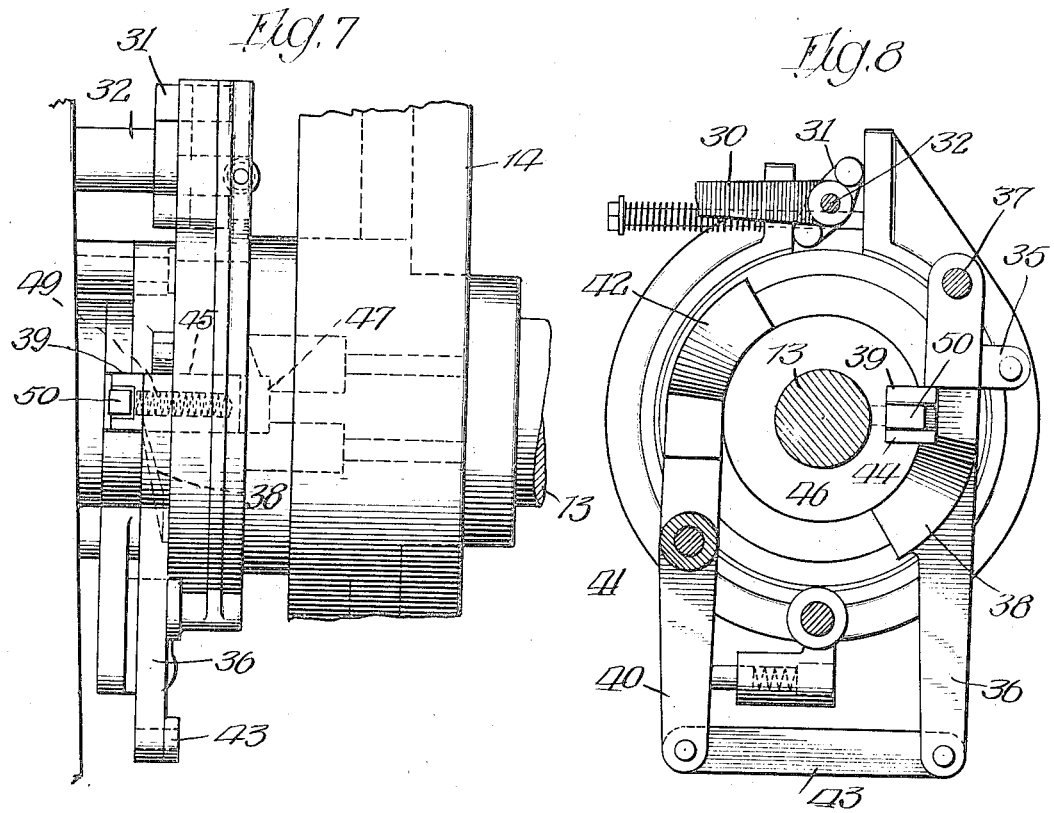
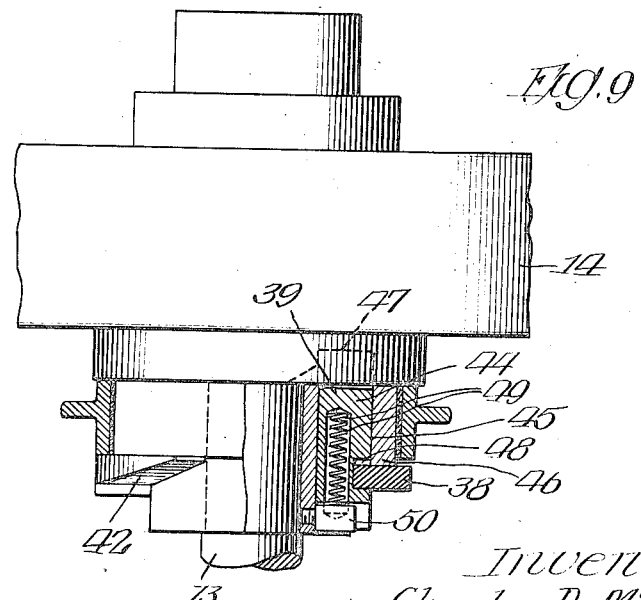

CHARLES D. McDONALD, OF CHICAGO, ILLINOIS.

AUTOMATIC DIE-PRESS.

1,375,924.  Specification of Letters Patent.  Patented Apr. 26, 1921.

Application filed July 9, 1918. Serial No. 244,041.

*To all whom it may concern:*

Be it known that I, CHARLES D. McDONALD, a citizen of the United States, residing at Chicago, in the county of Cook and State of Illinois, have invented certain new and useful Improvements in Automatic Die-Presses, of which the following is a specification.

The present invention relates to an automatic die-press of the fast-acting type used in connection with the stamping of articles from tin and other thin sheetmetal, and is an improvement on the construction shown in the following patents: No. 1,243,435, October 16, 1917, C. D. McDonald, attachment for ejectors of die-presses or like machines; No. 1,252,278, January 1, 1918, C. D. McDonald, attachment for feed bars of die-presses or the like; and No. 1,252,277, January 1, 1918, C. D. McDonald, appliance for die-presses or the like.

The objects of the invention are, to provide a clutch mechanism and a brake mechanism which are utilized in conjunction with the stopping and starting of the machine; and to so operate these mechanisms as to cause the brake to set before the clutch pin is drawn out of clutching engagement and to cause the brake to release just before the clutch pin is thrown into clutching engagement.

A further object of the invention is to provide a series of connections for actuating the clutch and brake mechanisms in the manner aforesaid, the first of the connections being influenced by an abnormal pressure to the progress of the movable die, whereby when such abnormal pressure is encountered the brake mechanism and the clutch mechanism will be automatically operated to stop the machine and with a timed relation established between the movements of the clutch pin and in and out of clutching engagement and the operation of the brake mechanism; to provide a second connection extending from the ejector which forces the stamped work out of the die, so that if there is an abnormal resistance encountered by such ejector, the clutch and brake will be automatically operated as aforesaid to stop the machine; and to provide a third connection extending from the feed bar, whereby if there is an abnormal resistance to the movements of said bar, the clutch and brake will be automatically operated as aforesaid to stop the machine. In this manner there is accomplished an automatic stopping of the machine whenever a jam or other trouble arises in connection with the dies, the ejector for forcing the work from the dies, or the feed means for placing the work into position to be acted upon by the dies.

The invention further consists in the features of construction and combination of parts hereinafter described and claimed.

In the drawings:

Figure 1 is a front view of a die-press equipped with the mechanism of the present invention;

Fig. 2 is a side view looking upon the right hand side of Fig. 1, and with the flywheel and feed mechanism removed;

Fig. 3 is a view looking on the left hand side of Fig. 1;

Fig. 4 is a detail showing the position of the brake and clutch actuating means when the machine is stopped;

Fig. 5 is a view similar to Fig. 4, showing the position of the clutch and brake actuating means when the lever has commenced to move to start the machine;

Fig. 6 is a detail showing the position of the clutch and brake mechanisms after the lever has been thrown to stop the machine, but before the clutch pin is extracted;

Fig. 7 is a detail front elevation of the clutch and brake mechanisms;

Fig. 8 is a side view of the clutch and brake mechanisms;

Fig. 9 is a plan view, partly in section, of said mechanisms, and showing the clutch pin retracted;

Fig. 10 is a view similar to Fig. 9, showing the clutch pin shoe moved into position and just starting to engage the clutch pin to retract it;

Fig. 11 is a perspective of the clutch pin; and

Fig. 12 is a detail showing the position of the clutch and brake mechanisms and the operating lever when the machine is running.

Referring now to the drawings, the invention is shown illustrated in connection with a press body 12, which may be of any suitable style and construction. Carried by and mounted upon said body is a main operating shaft 13, which is driven by a fly-wheel 14, to which power is imparted by a suitable belt or otherwise. There is a clutch mechanism for establishing a connection between the fly-wheel and shaft, which mechanism will be hereinafter described.

Operated by the main drive shaft 13 is a suction cup mechanism 15 for lifting the work up and into position to be placed in engagement with the feed members of a reciprocating feed bar 16. Neither the feed bar nor the suction cup mechanism will be explained in detail in the present case, since their operation is well known in the die-press art.

A male die carrying block 17 is employed, which is reciprocated up and down, and the male die carried thereby (not shown) acts in conjunction with the female die (not shown) for the purpose of forming articles from the strip of sheet-metal which is advanced by the feed bar into position to be acted upon by the dies. An ejector 18 is employed for forcing the work out of the male die after the forming operation is completed; and a scrap ejector 19 is provided for finally discharging the scrap work from the machine. Both of the aforesaid ejector mechanisms, together with the die mechanism, are fully shown and described in my Patents No. 1,243,435, No. 1,252,277 and No. 1,252,278 heretofore mentioned, and will not be described in detail.

The die mechanism as shown is operated by means of toggle arms 20, which are connected by a link 21 to a crank 22 on the main drive shaft. This gives a double action to the die members and increases the speed of the press. The details of such construction and the operation thereof are fully explained in my Patent No. 1,252,277, January 1, 1918, heretofore referred to. Although the present invention is illustrated in conjunction with this type of mechanism, this is not to be considered as a limitation upon the scope thereof.

The present invention deals with an automatic means which is operated either by a jam which obstructs the movement of the feed bar 16, the movement of the die block 17, or the movement of the ejector 18, whereby when such jam or obstruction is met, mechanism will be automatically set in motion for the purpose of releasing the shaft 13 from clutched engagement with the fly-wheel 14 and for setting the brake mechanism to prevent further movement of the shaft 13 after the unclutching operation.

The clutch and brake mechanisms are operated through the movements of a lever 23, which is pivoted at 24 to a cross-shaft 25. Connected at 26 to said lever is a link 27 joined to a pivoted beam 28 at one side of the center thereof. Connected to one end of the beam is a link 29 joined to a lever 30, which actuates a brake spreader 31 secured to a pin 32. Connected to the opposite end of said lever 28 is a link 33 joined to a bell-crank 34, to which is connected a link 35 joined to an arm 36, pivoted at 37.

The arm 36 carries a wedge-shaped or tapering portion 38, which acts, when moved to proper position, to withdraw the clutch pin 39 from engagement with the fly-wheel and hold it retracted, and acts when moved out of such position to release the pin and allow it to reëngage with the fly-wheel.

A second arm 40 is provided, which is pivoted at 41, and this arm 40 carries a similar wedge-shaped portion 42; and the arms 36 and 40 are connected by a link 43. It is obvious that as the link 33 is moved, it will swing the arms 36 and 40 in opposite directions, by reason of the arm 36 being pivoted at its upper extremity and the arm 40 being pivoted intermediate its length.

One form of suitable clutch pin is shown in detail in Fig. 11, and consists of a body 44, which is adapted to project through an opening 45 in a hub 46 connected to the shaft 13; and is further adapted to pass on through the opening 45 and into a recess or seat 47 in the fly-wheel. The pin is formed with a notch 48, and when the pin is in projected position so that it is in engagement with the fly-wheel, this notch will extend slightly beyond the edge of the hub 46 as in Fig. 10. Located within the pin is a spring 49, which bears against a fixed lug 50, and the tension of said spring serves to keep the pin under a tension tending to project it toward the fly-wheel.

With the parts as in Fig. 12, the press is running, and under such conditions the arms carrying the clutch actuating shoes are in outward position, as shown, and the lever is in the raised position of said figure. With the machine operating, the brake spreader is in the position of Fig. 12 and the brakes are open. To stop the machine, the lever is thrown from the position of Fig. 12 to that of Fig. 6; the link 27 will be moved to rock the pivoted lever 28 and move the links 33 and 29. Movement of the link 29 will serve to operate the brake spreader so as to allow the brakes to set upon the hub 46 by spring action, and movement of the link 33 will rock the bell-crank 34, actuating the link 35 to throw the arm 36 inward as in Fig. 6; and through the medium of the link 43, the arm 40 will also be thrown inward. When these arms are thrown inward, the tapered portions thereof move into a position where one or the other will enter the exposed part of the notch 48 in the pin 44, as in Fig. 10; and owing to the sloping surface of said tapered portions of said arms, a further carrying of the pin by the action of the fly-wheel will cause the notched portion of the pin to move along the tapered surface, causing the pin to move outward into the position shown in Fig. 9, wherein it has been retracted a sufficient distance to be withdrawn from its seat in the fly-wheel. The brakes will, however, have set before the pin has traveled along the tapered portion and been withdrawn, so that immediately when the driving force from the fly-wheel is relieved by extraction of the pin, the brake will act to at once bring the shaft 13 to a stop.

While the arms which carry the tapered surfaces that actuate the clutch pin may move to operating position at practically the same time as the brake spreader, the tapered portions after reaching their thrown position will have to act upon the pin to withdraw it, and by referring to Fig. 6, it will be seen that after the brakes are set, the clutch pin will have to travel far enough to ride up on the tapered surface, which causes it to move before the unclutching engagement will be effected. The brakes, therefore, under all conditions are set before the clutching connection between the fly-wheel and shaft is broken. It is important that this feature be carried out, in order to prevent possible injury to the machine.

When it is desired to start the machine, the parts are moved from the position of Fig. 4 to that of Fig. 12 by pulling the lever upward. This imparts a movement to the brake spreader, as in Fig. 5, forcing open the brakes and causing them to release from the hub 46. The arms 36 and 40, which carry the tapered portions, are withdrawn and when moved a distance so that the tapered portion is free from the wall of the slot 48 in the pin, the spring 49 acts to project the pin 44 inward; and when the fly-wheel, which is constantly revolving, shall have turned to a position where the slot 47 therein is in alinement with the projected pin, the spring pressure on said pin will cause it to enter the slot in the fly-wheel and the clutch connection with the fly-wheel will again be established. However, before this happens, the brake will have been released, since the brake releases at the commencement of the movement of the arms, which releases the clutch pin; and before the clutching engagement is established, the fly-wheel must have revolved into position to bring the slot 47 into alinement with the pin.

From the foregoing, it will be seen that there is a timed relation between the actuation of the clutch mechanism and the brake mechanism, so that the brakes are set before the clutch pin is withdrawn, and the brakes are open before the clutch pin reengages. In the present construction, two arms 36 and 40 are shown, because the present machine is illustrated in conjunction with the toggle action produced by the toggles 20. This, however, is not a limitation to the invention, since it might be just as operative with a single arm. The use of the two arms in this type of press is deemed expedient because of the fact that it is desired to stop the machine when the male die is in upward position, and with the toggle action it reaches such upward position twice during a revolution of the crank shaft; and the two arms are employed so that the pin will be withdrawn at the end of each half revolution of the shaft, thereby always stopping the press when the die is at the limit of its upward movement.

There remains to be described, the mechanism which automatically actuates the clutch and brake when jams occur as heretofore stated. This mechanism is described in my Patents No. 1,243,435, No. 1,252,277 and No. 1,252,278 above referred to and will not be set forth in detail at this time. It is sufficient to say that the brake and clutch mechanisms are actuated when a jam occurs, tending to obstruct the movements of the male die by reason of the back pressure due to such obstruction, moving a head 51, which raises a pin 52, actuating a pivoted arm 53, pulling a link 54, which has a head 55 thereon, and engaging with an arm 56 connected to the rock-shaft 25. Obviously, as this shaft is rocked, it will cause an actuation of the brake and clutch as described. The foregoing is particularly shown and described in Patent No. 1,252,277 aforesaid.

When a jam occurs, interfering with the operation of the ejector 18, the pressure on said ejector will cause a block 57 to rock about its pivot 58. This block has a cam-surface 59, which tends normally to move the ejector and discharge the work out of the die. But if action of the ejector is interfered with, by reason of a jam, then instead of the block moving the ejector, the ejector will move the block. The block when forced rearward moves a pivoted bell-crank 60, which depresses a link 61 connected at 62 to the rock-shaft 25, causing a movement of the brake and clutch to stop the machine, as described. This mechanism is particularly described in my Patent No. 1,243,435 aforesaid.

When a jam occurs in the feed-way, a spring-pressed jaw 63 on a link 64 attached to the feed bar will be forced open to release from engagement with a pin 65 on the end of a bell-crank 66. When so released, the link 64 will drop by gravity, moving downward an arm 67, actuating a lever 68 pivoted at 69, and pulling downward a rod 70, which is also connected to rock the rock-shaft 25 and set the clutch and brake to stop the machine. This mechanism is particularly described in my Patent No. 1,252,278 aforesaid.

It is therefore apparent how a jam interfering with the movements of either the die, the ejector, or the feed bar, will automatically actuate the clutch and brake in timed relation to one another and bring the machine to a stop, thus preventing damage being done by the machine continuing to operate after an obstruction has been encountered. In each instance after the lever 23 has been thrown to move the clutch and brake mechanisms to stop the machine, the lever must be reset by hand to put such mechanisms back in position to again commence operation of the machine.

I claim:

1. In a die-press having automatic power driven feed, die and ejector mechanism, and having a main operating shaft and a clutch mechanism for driving said shaft, the combination with said shaft, of a brake, clutch actuating mechanism, and brake actuating mechanism, overload connections between all of said automatic devices, and said brake and clutch mechanisms for actuating said mechanisms, the arrangement being such that the brake will be set before the clutch is released and will be opened before the clutch is engaged.

2. The combination in a die-press having a main shaft and clutch actuating mechanism for said shaft, and having a plurality of automatic stock engaging devices, of a brake for said shaft, and overload connections from all of said automatic devices adapted to actuate the brake and clutch in the manner described.

3. A die-press having a power shaft and a clutch for operating said shaft, a brake for said shaft, coacting means for operating the brake and clutch, whereby the brake will be set before the clutch is released and will be opened before the clutch is engaged, said press having a plurality of automatic stock engaging mechanisms, and connections between all of said automatic mechanisms and the coacting clutch and brake operating mechanisms, whereby said clutch and brake will be operated whenever any of said automatic mechanisms offer a resistance above a predetermined amount.

4. In a die-press having a main driving shaft and having automatic stock engaging devices, the combination with the main driving shaft and driving pulley, of a clutch for throwing the pulley into engagement with the shaft, a brake mechanism for said driving shaft, and means operated by connections to said stock engaging devices for actuating said brake and clutch, whereby the brake will be set before the clutch is released and will be opened before the clutch is engaged.

CHARLES D. McDONALD.